US012636836B2

(12) United States Patent
Dorini

(10) Patent No.: US 12,636,836 B2
(45) Date of Patent: *May 26, 2026

(54) METHOD FOR CALIBRATING HEAT SOURCES IN AN APPARATUS FOR THE MANUFACTURE OF 3D OBJECTS

(71) Applicant: Stratasys Powder Production Ltd., London (GB)

(72) Inventor: Gianluca Dorini, London (GB)

(73) Assignee: Stratasys Powder Production Ltd., Nottingham (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/943,621

(22) Filed: Sep. 13, 2022

(65) Prior Publication Data

US 2023/0091823 A1      Mar. 23, 2023

(30) Foreign Application Priority Data

Sep. 13, 2021     (GB) ....................................... 2113001

(51) Int. Cl.
*B29C 64/393*          (2017.01)
*B29C 64/153*          (2017.01)
(Continued)

(52) U.S. Cl.
CPC .......... *B29C 64/393* (2017.08); *B29C 64/153* (2017.08); *B33Y 10/00* (2014.12); *B33Y 40/10* (2020.01); *B33Y 50/02* (2014.12)

(58) Field of Classification Search
CPC ..... B29C 64/00; B29C 64/153; B29C 64/165; B29C 64/291; B29C 64/393
See application file for complete search history.

(56) References Cited

U.S. PATENT DOCUMENTS

2017/0001243 A1* 1/2017 Hayano ................. B29C 64/255
2017/0239892 A1* 8/2017 Buller ................. B28B 17/0081
(Continued)

FOREIGN PATENT DOCUMENTS

WO     2018/186872 A1    10/2018
WO     2019/070250 A1     4/2019
(Continued)

*Primary Examiner* — Seyed Masoud Malekzadeh
(74) *Attorney, Agent, or Firm* — Honigman LLP; Eric J. Sosenko; Jonathan P. O'Brien

(57) ABSTRACT

A method for calibrating heat source(s) in an apparatus for manufacturing 3D objects including layer cycle steps of: distributing a layer of particulate material over a build bed; heating the layer with a heat source at a first power profile; measuring a set of temperatures at multiple regions; depositing absorption modifier (absorber) over each region and/or depositing absorption modifier (inhibitor) over a surrounding area; heating each region with the heat source or a second heat source at a second input power profile; and measuring a second set of temperatures at each region; repeating the layer cycle using different input power profiles; and determining an adjusted first and/or second input power profile, wherein when applied during a subsequent layer cycle, causes a subsequent measured set of temperatures to be within a range of target temperatures, such that the ranges are reduced over those measured for each of the calibration layers.

19 Claims, 6 Drawing Sheets

(51) Int. Cl.
    *B33Y 10/00*         (2015.01)
    *B33Y 40/10*         (2020.01)
    *B33Y 50/02*         (2015.01)

(56)            References Cited

U.S. PATENT DOCUMENTS

| | | | |
|---|---|---|---|
| 2018/0186074 A1* | 7/2018 | Hull | B22F 12/41 |
| 2020/0269498 A1* | 8/2020 | Ramaekers | B29C 64/393 |
| 2020/0398482 A1* | 12/2020 | Tjellesen | B29C 64/209 |
| 2021/0362429 A1* | 11/2021 | Barnes | B33Y 10/00 |

FOREIGN PATENT DOCUMENTS

| | | | |
|---|---|---|---|
| WO | 2019/143347 A1 | 7/2019 | |
| WO | 2020/222828 A1 | 11/2020 | |

* cited by examiner

METHOD FOR CALIBRATING HEAT SOURCES IN AN APPARATUS FOR THE MANUFACTURE OF 3D OBJECTS

FIELD OF THE INVENTION

The present disclosure relates to a method for calibrating one or more heat sources in an apparatus for the layer-by-layer manufacture of three-dimensional (3D) objects from particulate material. A controller and an apparatus for applying the method are also disclosed.

BACKGROUND

In applications for forming 3D objects from particulate material, such as so-called "print and sinter" and laser sintering processes, an object is formed layer-by-layer from particulate material that is spread in successive layers across a build bed. Each successive layer of the object is melted or partially melted to fuse or sinter the particulate material over defined regions and in so doing to consolidate it, in order to form a cross section of the 3D object.

In the context of particulate polymer materials, for example, the process of melting achieves fusion of particles. Such a process requires accurate temperature control over the temperature of the surface that is being processed to achieve high-quality uniform objects with well-defined properties. Temperature control requires use of a thermal sensor, such as a pyrometer or thermal camera that detects the temperature of the build bed surface. For reliable process control from build to build or between different apparatus, it is desirable to calibrate the input power to the heat sources that contribute to the thermal control of the layer surface. Such heat sources may be infrared bar heaters moved over the build bed surface to heat the particulate material in different power modes. For example, the build process may comprise a preheat step during which the particulate material reaches a temperature near to but below the melting point, and a fuse step during which the material is heated enough so that it melts. The input power of the one or more heat sources that provide these two heating steps requires calibration against a reference such that the desired temperatures are achieved. This, for example, ensures that fusing occurs as intended.

Furthermore, significant temperature differentials may be prevented to subsist or at least be reduced between fused and unfused areas. Where a heat source is operable at an input power that can be varied over the layer surface, for example along one direction with respect to a dimension of the layer surface, adjustments to the input power profile may in addition be made to reduce or prevent non-uniformities in the temperature of the build bed surface. Such non-uniformities lead to poor control over object quality. Known methods use a thermal sensor to calibrate heating effects of one or more heat sources on the layer by measuring the temperature of individual regions heated by operating a respective heat source above them at different powers. It was found that such known techniques are however not adequate and frequently lead to unexpected variation in a subsequent build process. The present invention provides an improved calibration method to reduce or eliminate such variation.

SUMMARY

The following disclosure describes a method for calibrating one or more heat sources in an apparatus for the layer-by-layer manufacture of a 3D object from particulate material: the apparatus comprising at least one heat source and a thermal sensor; the method comprising: the layer cycle steps of:

(a) distributing a layer of particulate material over a build bed along a first direction, the layer providing a build bed surface of the build bed;

(b) heating the layer by operating a first heat source at a first input power profile along the first direction;

(c) measuring a first set of temperatures using the thermal sensor, the first set of temperatures comprising respective measurements of first temperatures of each of a plurality of regions within the build bed surface;

(d) depositing absorption modifier in the form of radiation absorber over each region; and/or depositing absorption modifier in the form of absorption inhibitor over a surrounding area surrounding the plurality of regions;

(e) heating each region by operating either the first heat source or a second heat source at a second input power profile, the second power profile extending along the first direction; and (f) measuring a second set of temperatures using the thermal sensor, the second set of temperatures comprising respective measurements of second temperatures of each of the regions;

repeating the layer cycle for a number of layers, each layer using a respective pair of first and second input power profiles, wherein each said pair is different to the preceding pairs; and determining, based on a first target temperature and a second target temperature, from the measured first sets and second sets of temperatures for each pair of input powers, at least one of a respective adjusted first and second input power profile, wherein the adjusted first and/or second input power profiles, when applied during a subsequent layer cycle, causes a subsequent measured first set of temperatures to be within a first range of the first target temperature, and a subsequently measured second set of temperatures to be within a second range of the second target temperature, such that the first and second ranges are reduced over those measured for each of the calibration layers.

BRIEF DESCRIPTION OF THE DRAWINGS

Reference is now directed to the drawings, in which.

In the drawings, like elements are indicated by like reference numerals throughout.

DETAILED DESCRIPTION

An improved method for calibrating the heat sources in a 3D printing apparatus, an associated apparatus and controller therefor, and a resulting test part, will now be described with reference to FIGS. 1A to 7.

Figure 1A:
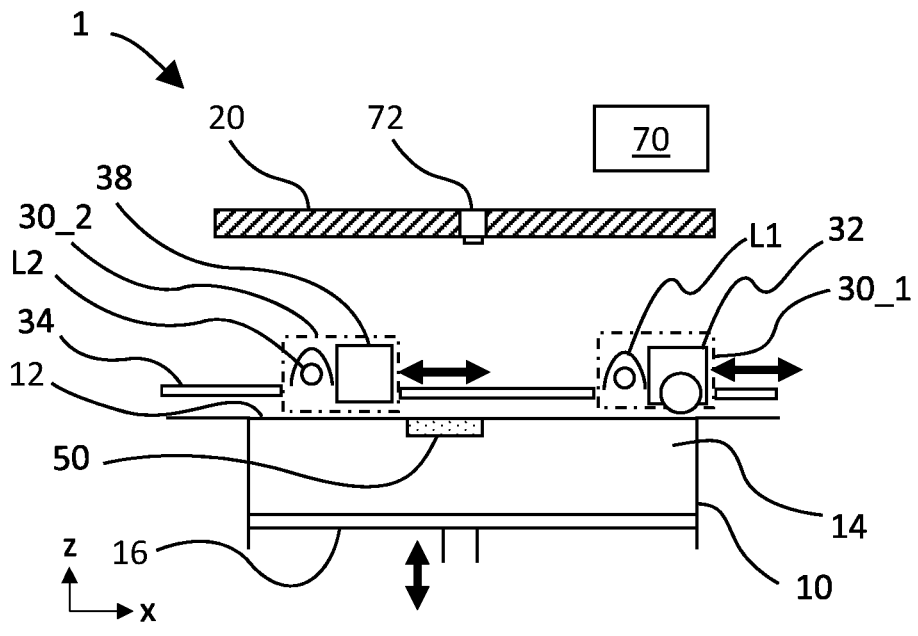
FIG. 1A is a schematic cross-section of a side view of an apparatus configured to apply the method according to the invention.

FIG. 1A schematically illustrates detail of a cross section of an apparatus 1 for the layer-by-layer consolidation of particulate material, also known as a powder bed fusion type apparatus. The apparatus 1 as illustrated is configured to carry out the method and its variants, which will now be described.

Turning first to a typical process in a powder bed fusion apparatus, successive layers of particulate material are distributed, each to form a build bed surface 12, which are then processed to form successive cross-sections of the object. In this context, the reference to the 'build bed surface' is to the surface of the top-most layer of particulate material. In other words, each newly distributed layer forms a new build bed surface 12 that forms the build bed surface 12 of the layer to be processed in that particular layer cycle.

Modules for distributing the particulate material and processing the formed layer are provided on one or more carriages that are moveable across the layer. Accordingly, for illustrative purposes, FIG. 1A shows two carriages 30_1 and 30_2 arranged on one or more rails 34 that allow the carriages to be moved back and forth along the same direction above the build bed 14. The build bed 14 of particulate material is supported by a container having walls 10 and a platform 16. The platform 16 supporting the build bed 14 is arranged to move vertically within the container walls 10 to lower or raise the build bed surface 12: for example by operating a piston located beneath the platform 16. The apparatus further comprises, without specifically showing, a reservoir to supply particulate material to a dosing module that doses an amount of fresh particulate material to be distributed across the build bed, thus forming a new build bed surface 12. In other implementations of the apparatus, the reservoir may supply particulate material to the distribution device, and the distribution device is configured to dose the material to the build area as it passes over it.

In this illustration, a first of the carriages, carriage 30_1, comprises a distribution module 32 comprising a roller to distribute a new layer of particulate material over the build bed 14 from an amount of material dosed to a surface comprising the build bed surface 12. On a second carriage 30_2, a deposition module 38 is supported for selectively depositing absorption modifier over the build bed surface 12. Module 38 may be, for example, a fluid deposition module, comprising one or more droplet deposition heads, such as printheads, for depositing radiation absorbing fluid over a defined region 50.

A heat source L2 is provided on the carriage 30_2 to heat the region 50 following deposition of the radiation absorbing fluid. The heat source L2 is configured to emit radiation that comprises a spectrum that at least partially overlaps with the absorption spectrum of the radiation absorbing fluid but that is not significantly absorbed by the particulate material itself. The radiation-absorbing fluid thus may absorb radiation readily from the heat source L2 and selectively heat the particulate material it is in thermal contact with (i.e. within the region 50) preferentially over that of the surrounding area which is not in contact with radiation-absorbing fluid. If the combination of absorber amount and power input to the heat source L2 (causing a certain resultant energy to be input to the region 50) is sufficient, the particulate material of region 50 will for example melt/sinter to fuse and form a region 50 of consolidated particulate material. Thus, during a build process of an object, the radiation-absorbing fluid may be deposited over selected portions of the build bed surface 12 so as to define the cross sections of the object which are built up over successive layers. During a calibration process, the region 50 may define a test part, or a section of a test part, processed for measurement purposes. During a build process, the region 50 may represent a cross section of the object to be built.

Figure 1B:
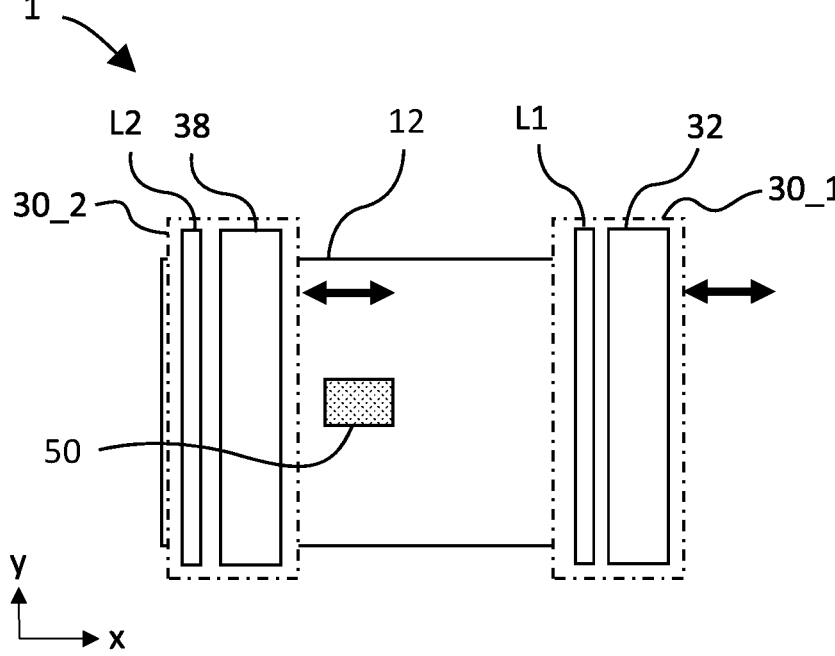
FIG. 1B is a schematic plan view of the build bed surface of the apparatus of FIG. 1A.

In some apparatus, and as exemplified in the apparatus 1 of FIGS. 1A and 1B, a further heat source L1 may be arranged to immediately preheat the layer following distribution of particulate material by the distribution module 32. FIG. 1B shows a plan view of the build bed surface 12 of FIG. 1A comprising the region 50. The first and second carriages 30_1 and 30_2 with their respective modules are shown to span the width of the build bed surface 12 (along y). As indicated before, each carriage 30_1, 30_2 is moveable back and forth along the x-axis, which herein is also referred to as the length of the build bed surface 12, the length being perpendicular to the width, however reference to length and width is not intended to indicate relative extent of the two directions but to merely help reference directions of the process.

The two heat sources will in the following be referred to as "first heat source" L1, which is used to heat the newly distributed particulate material, and "second heat source" L2, which is used to heat the region 50 following deposition of absorption modifier. The temperature of a new layer of fresh particulate material is much lower than that of the previous, processed layer, and providing a first heat source L1 may be an effective way of returning, or preheating, the new build bed surface 12 towards a predefined preheat target temperature (in the following also referred to as "first target temperature value, T1(target)"). The preheat target temperature/first target temperature value, T1(target) may be lower than a melting point and higher than a solidification temperature of the particulate material. This may be done in combination with or in addition to operating a stationary overhead heater 20 provided above the build bed surface 12 which may be configured to achieve and maintain the build bed surface 12 at a layer target temperature between the solidification temperature, or the glass transition temperature, and the melting temperature of the particulate material. The target layer temperature may in some cases be defined as a value closer to the melting temperature than the first target temperature value T1(target).

The first and second heat sources L1 and L2 may be elongate infrared bar heaters, and in practice each may perform differently at identical power inputs due to manufacturing variability or due to changes in performance as a result of ageing. To adequately control the required heating processes provided by the first and second heat sources L1, L2 therefore, it is necessary to align the performance of the heat sources with respect to one another. If adequately controlled, it may be ensured that the region 50 will consolidate as expected during an object build process, and the persistence of large temperature differentials between fused and unfused areas that cause warping or curl of the fused regions may be significantly shortened in time by operating the first heat source L1 at appropriate power inputs throughout the layer cycle. This improves control over mechanical and visual properties of a finished object and therefore reliability of the build process.

The inventor has developed an improved calibration routine for heat sources in an apparatus for the layer-by-layer manufacture of a 3D object from particulate material. The apparatus comprises one or more heat sources and a thermal sensor configured to measure the temperature of or within the build bed surface 12, and the method comprises the layer cycle steps of: (a) distributing a layer of particulate material over the build bed 14 along a first direction, such as along x as shown in FIGS. 1A and 1B, the layer providing the build bed surface 12 of the build bed 14; (b) operating a first heat source L1 at a first input power profile P1 over the build bed surface 12 so as to heat it, the first input power profile P1 extending along the first direction, for example along x as shown in FIG. 1A. The input power profile is the input power at which the heat source is addressed while it heats the build bed surface 12 along the first direction. The input power may be a constant or varying input power along the first direction, and is herein referred to as "input power profile" with respect to distance along the first direction; (c) measuring a first set S1_m of temperatures using the thermal sensor 72 arranged above the build bed surface 12, the first set S1_m of temperatures comprising respective measurements of first temperatures T1_n of each of a plurality of regions 50_n within the build bed surface 12; (d) depositing absorption modifier in the form of radiation absorber over each region 50_n; and/or, depositing absorption modifier in the form of absorption inhibitor over a surrounding area surrounding the plurality of regions 50_n; (e) operating the first heat source L1, or a second heat source L2 as shown in FIG. 1A, at a second input power profile P2 so as to heat each of the plurality of regions 50_n, the second input power profile P2 extending along the first direction; and (f) measuring a second set S2_m of temperatures using the thermal sensor 72, the second set S2_m of temperatures comprising respective measurements of second temperatures T2_n of each of the regions 50_n; repeating the layer cycle for a number (m−1) for a total number m of calibration layers, wherein for each layer a respective pair (P1, P2)m of first and second input power profiles is applied, and wherein each said pair (P1, P2)m is different to the preceding pairs; and determining, based on a first target temperature T1(target) and a second target temperature T2(target) from the measured first sets S1_1, S1_2, S1_m of temperatures and the measured second sets S2_1, S2_2 . . . , S2_m of temperatures for each of the pairs (P1, P2)m of input powers, at least one of a respective adjusted first and second input power profile P1', P2'. The first target temperature T1(target) and the second target temperature T2(target) may be predetermined experimentally for example, from mechanical and/or aesthetic properties of test objects, and used as input to the step of determining the adjusted first and second input power profile P1', P2'.

When, during a subsequent layer cycle, the adjusted first and/or second input power profiles P1', P2' are applied to the first heat source L1 in respective heating steps (b) and (e), or, where two heat sources are present, when the adjusted first and/or second input power profiles P1', P2' are applied to the respective first and/or second heat source L1, L2, the measured (adjusted) first set S1' of temperatures falls within a first range R1 of the first target temperature T1(target), and the measured adjusted second set S2' of temperatures falls within a second range R2 of the second target temperature T2(target), such that the first and second ranges R1, R2 are reduced over those measured for each of the m calibration layers. Thus, a flattened temperature profile may be provided over the build bed surface 12 when applying the first and/or second adjusted input power profiles P1', P2' to a subsequent layer cycle having the same heating steps as the calibration layer cycle. Thus the first target temperature T1(target) may be a preheat temperature between the melting temperature and the solidification temperature of the particulate material, to be achieved by a step of heating following distributing of new layer. In some variants, the first target temperature value, T1(target), may the same as the layer target temperature T4(target). The second target temperature T2(target) may be a temperature that is equal to or exceeds the melting temperature of the particulate material, to be achieved at the second heating step following depositing absorption modifier (e.g. radiation absorber), so as to achieve melting and fusing of a region that is to be a cross section of an object in a subsequent build process.

In arrangements of the apparatus comprising a single heat source L1 or L2, the function of the second heat source may equally be provided by the first heat source. Thus in variants, the method steps may be applied by the first heat source instead of the second heat source. Where the first heat source is used for both heating steps (b) and (e), the first heat source may be positioned in any suitable manner within the apparatus, and may be heat source L1 or heat source L2. For a variant of the apparatus shown in FIG. 1A, the first carriage 30_1 may have a first heat source L1 whilst the second carriage 30_2 does not have a heat source. The same heat source L1 may be thus require to be operated in two different modes to provide the two different heating steps during the layer cycle, i.e. the first and second heat sources may be a "first mode heat source" and a "second mode heat source" provided by the same heat source. In this variant the single heat source requires to be returned along the second direction opposite the first direction between the two heating steps. The at least one of a respective adjusted first and second input power profile P1', P2' is applied to operate the first and second heat sources L1, L2 during their respective heating steps of the subsequent layer cycle.

The following description will illustrate the method with respect to two separate heat sources L1 and L2. In this case, for each layer of the layer cycle, a respective pair (P1, P2)m of first and second input power profiles is applied to the first and second heat source L1, L2, and during layer cycles of any subsequent process the adjusted first and second input power profiles P1', P2' may be applied to operate the first and second heat source L1, L2, respectively.

The two temperature measurements T1, T2 for each region 50_n result from the same layer, and since both heat sources are operated over each layer, the two temperature measurements T1, T2 reflect temperatures resulting from exposure to both heat sources L1, L2, as they might typically do in a subsequent build process. Thus each region 50_n is heated by both the first and second heat source L1, L2 in a stable thermal cycle of the layer similar to that of a build process. This provides improved results over methods that compare a region heated in separate layer cycles by respective first and second heat sources, i.e. heating during each layer cycle with one heat source while turning off the other. Similarly, heating different areas of the same layer by different heat sources is not preferred since the two areas experience different conditions compared to one another, and compared to a typical build process.

Preferably, each layer comprises a set of sublayers so that thermal stability may be achieved over the first few sublayers before measurements of the plurality of regions 50_n are considered over the remaining sublayers, where each sublayer is processed according to the same layer cycle of that layer and applying the same pair of first and second input power profiles P1, P2 of that layer. Thus from one or more of the plurality of remaining sublayers, a respective average first and second temperature is determined for the measured first and second temperatures for each region, which replace the respective first and second temperatures used in the determination of the adjusted first/second input power profiles.

In the examples described herein, the radiation of the first and second heat sources L1, L2 and that of the overhead heater 20 may be infrared radiation, and the absorption modifier in general terms may be arranged to cause each region 50_n to heat up more than the surrounding area. An infrared radiation absorber may be carbon black and an infrared absorption inhibitor, or inhibitor, may be water acting as a coolant, or a reflector of the radiation used to heat at block 110 (see FIG. 2). However, other wavelength spectra may be suitable in combination with suitable absorption modifiers and particulate materials.

In some examples, both types of absorption modifier may be provided to achieve the desired selectivity and degree of absorption of radiation from the second heat source L2 by the first and second regions. In the case of absorption inhibitor, each region 50_n may be left void of inhibitor while the area surrounding each region 50_n is provided with inhibitor, or each region may alternatively be provided with a lower amount of inhibitor compared to the surrounding area and that causes a higher absorption of energy by the particulate material from the second heat source L2 compared to that of the surrounding area. In addition to radiation absorber provided over each region 50_n, absorption inhibitor may be provided over the area surrounding the regions 50_n. The absorption modifier may be deposited in the form of droplets of a fluid, for example by a droplet deposition head comprised within the droplet deposition module 38, which provides the selective deposition required to define the cross sections of the object over successive layers, or to define each of the plurality of regions 50_n before being heated by the second heat source L2 during the calibration method described herein.

Power, Pairs of Power Inputs

The heating effect by each of the first and second heat sources L1, L2 is determined by factors including the input power to each heat source. For each layer cycle of a total number of m calibration layers, the first and second heat source L1, L2 are operated at a respective first and second input power profile P1_m, P2_m, forming a pair of input power profiles (P1_m, P2_m). Thus for the first layer, m=1, of the calibration method, the first heat source L1 is operated at a first input power profile P1_1 and the second heat source L2 is operated at a second input power profile P2_1. These conditions remain the same for any sublayers comprised within that layer. Throughout the layer cycle of the second layer, m=2, of the calibration method, the first heat source may next be operated at an input power profile P1_2 and the second heat source at an input power profile P2_2. These conditions again remain the same for any sublayers comprised within that layer. Throughout the layer cycle of the third layer, m=3, of the calibration method, the first heat source L1 is operated at an input power profile P1_3 and the second heat source L2 is operated at a power P2_3. These conditions also remain the same for any sublayers comprised within that layer.

Thus, for example, three pairs of first and second input powers (P1_1, P2_1), (P1_2, P2_2) and (P1_3, P2_3) are applied in turn, wherein each pair differs from another pair by at least one of the power inputs P1 and P2. The first input power profile P1 may be equal to the second input power profile P2 for at least one of the m pairs of input power profiles.

The first heat source L1 may be used as a preheat source in the apparatus 1 for any subsequent build process. Alternatively, in apparatus variants, the first heat source L1 may be arranged so as to provide a second heating step following that of the second heat source L2. In other words, the two heat sources L1, L2 may subsequently be required to be operated to provide very different energy outputs, or similar energy outputs. The pairs of power inputs may thus comprise variants of input power profiles that reflect the range of input power profiles for which preheat and fuse modes may be achieved. For example, a fuse mode may be achieved by operating for example the second heat source L2 at a high input power, such as 100% duty cycle. A preheat mode may be achieved by operating for example the first heat source L1 at a medium or low input power, such as 70%-50% duty cycle. The three pairs of power inputs may for example be arranged with input powers (high, high), (medium, high), (low, medium). These input power profiles may cause three sets of first, second and third temperatures T1, T2, T3, which allow a determination of an adjustment to one or both of the two heat sources L1, L2. In addition, where a variation of input power describes a profile that varies along the first direction, additional permutations of the layer cycle may comprise one or more pairs of input power profiles that describe at least one of the first and second input power profiles as a variable profile along the first direction. Thus, at least one of the first and second input power profiles P1_m, P2_m of at least one of the m pairs of profiles (P1, P2) may be a constant power input. Additionally, or instead, at least one of the first and second input power profiles P1_m, P2_m of at least one of the pairs of profiles may vary along the first direction. For example, at least one of the first and second input power profiles P1_m. P2_m of at least one of the pairs of profiles may be a monotonically decreasing power profile. During a subsequent layer cycle of, for example, a build process of the object, the first heat source L1 at the adjusted first input power profile P1' may be used to preheat the freshly distributed subsequent layer. For example, the adjusted first input power profile P1' may be a varying profile, for example a decreasing profile, along the first direction. The second heat source L2 may be used to melt the particulate material of an object region, as defined by absorption modifier, and representing a cross section of the object to be solidified, by applying the adjusted second input power profile P2'. The adjusted second input power profile may be constant, i.e. non-varying, along the first direction.

Figure 2:
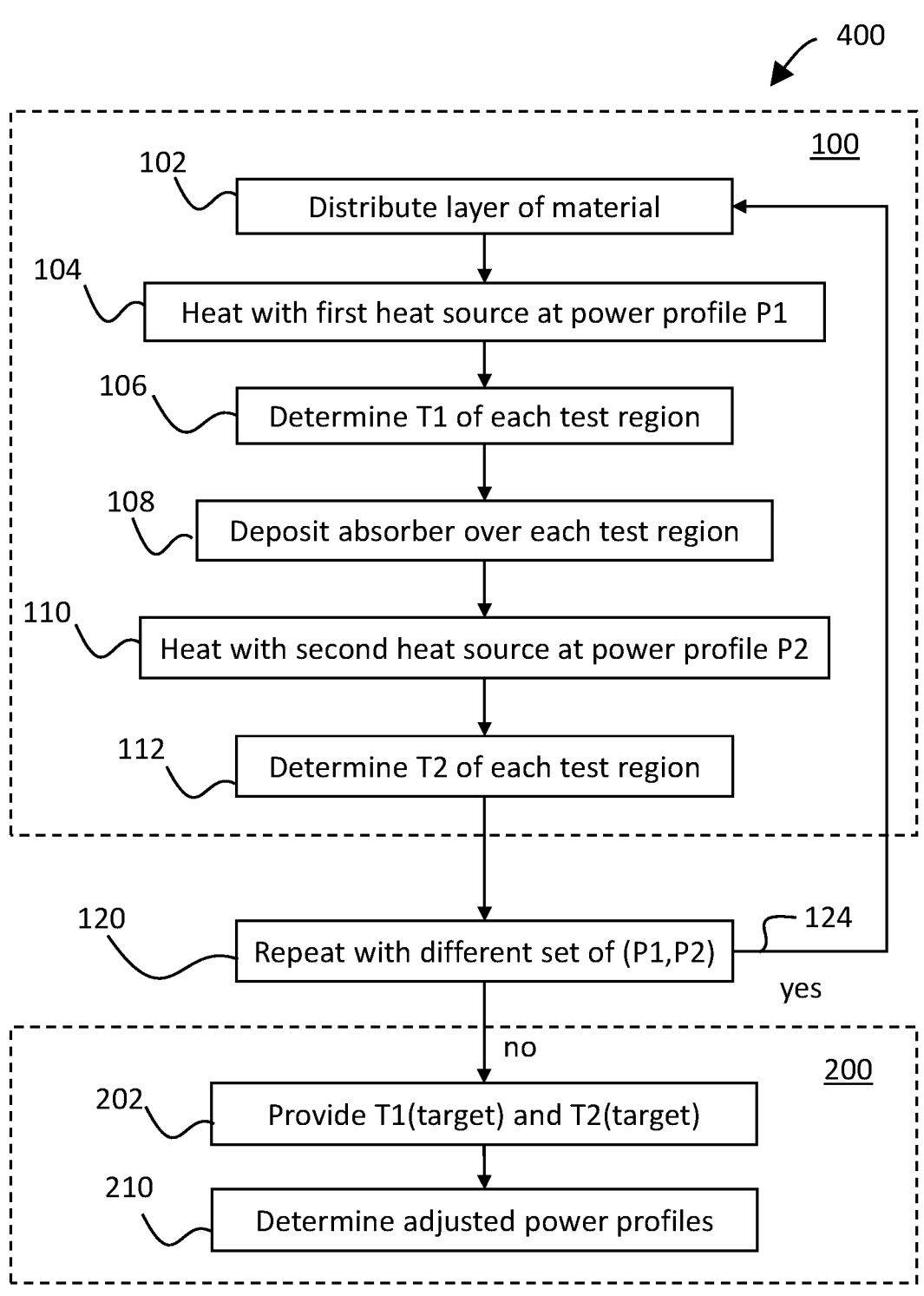
FIG. 2 is a flow chart of the method of the invention.
Figure 3:
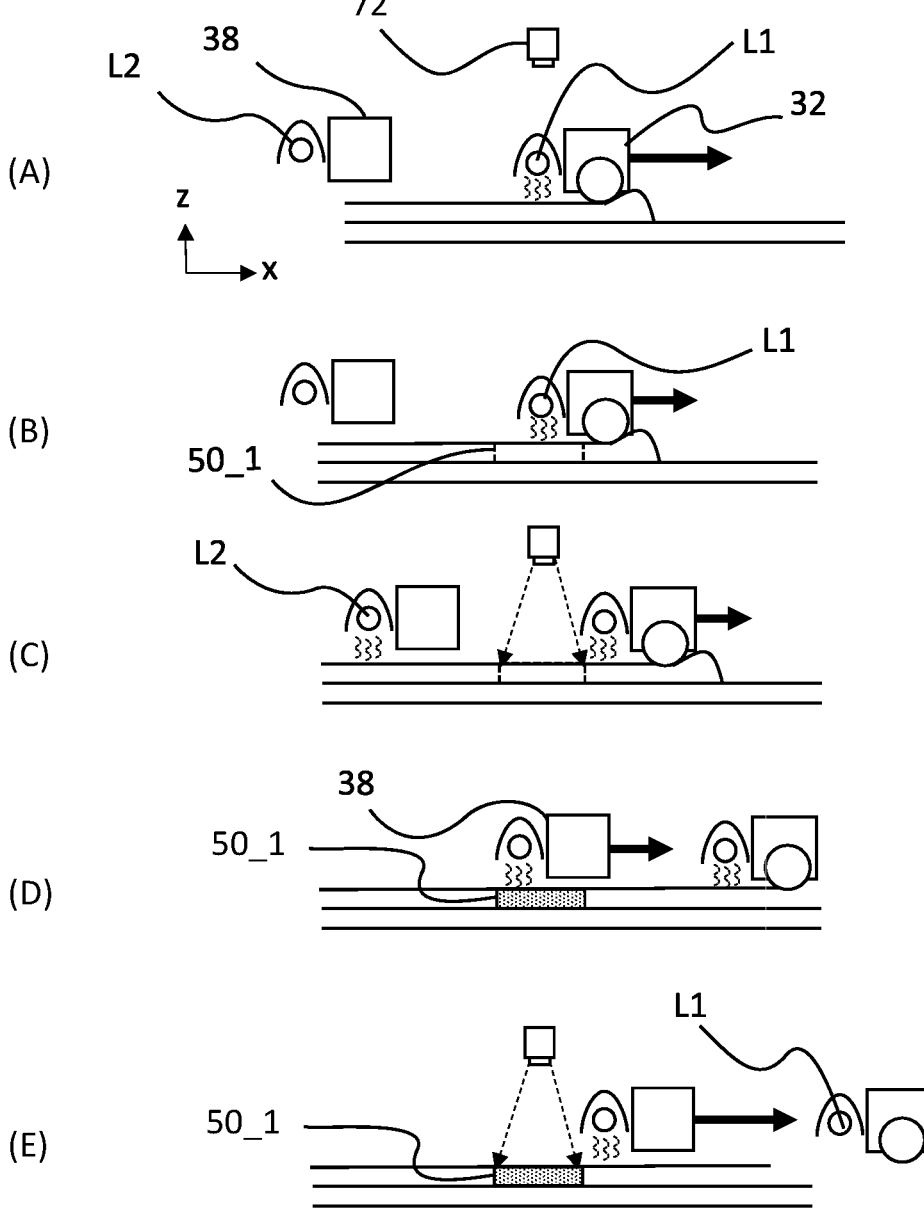
FIG. 3 is a schematic illustration of the layer cycle 100 of the flow chart of FIG. 2.
Figure 4:
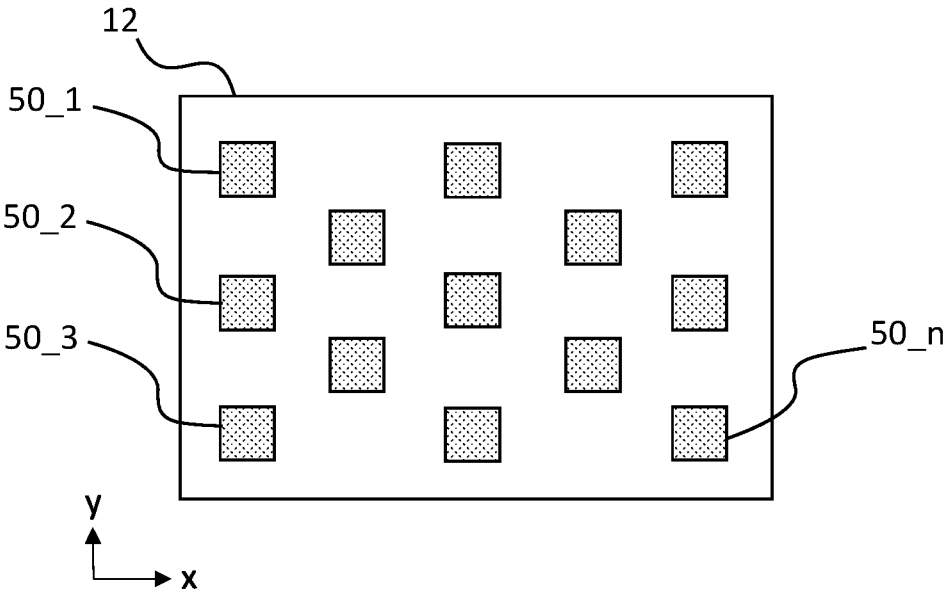
FIG. 4 is a schematic plan view of a build bed surface comprising a plurality of regions.
Figure 5:
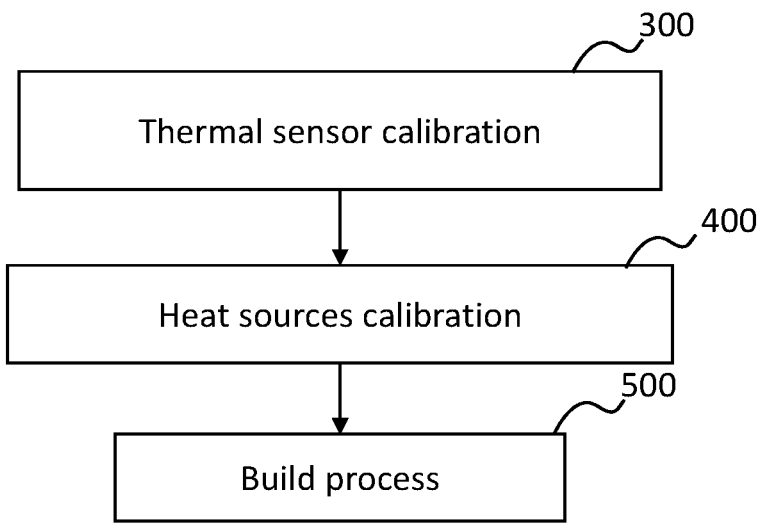
FIG. 5 is a block diagram of a process of operation of the apparatus comprising the method of FIG. 2.

The method is further illustrated in FIGS. 2 and 3, with respect to radiation absorber as an example, however the skilled person will be able to readily adapt the method with respect to inhibitor, or to a combination of absorber and inhibitor. FIG. 2 is a flow chart of the calibration method 400 comprising a layer cycle 100 followed by determination steps 200 of determining adjusted power profiles. FIG. 3A to 3E are a schematic illustration of the blocks of FIG. 2, and which may be implemented using the apparatus 1 as shown in FIGS. 1A and 1B. For each layer cycle 100, the following steps are carried out:

At block 102, a new layer of particulate material is distributed to form the new build bed surface 12.

At block 104, the first heat source L1 is operated at the first power profile along the first direction to heat the layer. As illustrated in FIG. 3A, the new layer may be distributed by distribution module 32, here a roller, and may be heated immediately following distribution by the first heat source L1. Both the distribution module 32 and the first heat source L1 may be provided on the same carriage 30_1 as shown in FIG. 1A, the first heat source mounted close behind the roller, with respect to the first direction along x, for example, and both are passed/moved over the build bed surface 12 together. The first power input profile P1 is applied throughout the traverse of the first heat source L1 across the build bed surface 12. A first period of time over which each of the plurality of regions 50_*n* is heated by the first heat source L1 may thus depend on the speed profile of the first heat source L1 along the first direction.

At block 106, and as illustrated in FIG. 3C, the first set of temperatures S1 of the plurality of n regions is measured using the thermal sensor 72 arranged above the build bed surface 12, where the first set of temperatures comprises the respective measured first temperatures T1_*n* of each of a plurality of n regions 50_*n* within the build bed surface 12. Only a first region 50_1 is indicated in FIGS. 5B to 5D.

At block 108, absorber is deposited over each of the plurality of regions 50_*n*, following which the regions are heated by the second heat source L2 operated at a second input power profile P2 at block 110. FIG. 3D illustrates this by passing the droplet deposition module 38, followed by the second heat source L2, over the build bed surface 12 along the first direction, or process direction, along x. As shown in FIG. 1A, the second heat source L2 may for example be mounted on the second carriage 30_2 close behind, with respect to the movement in the first direction, the deposition module 38. The period of time over which each region 50_*n* is heated by the second heat source L2 may thus depend on the speed profile of the second heat source L2 along the first direction.

Finally, at block 112, and as illustrated in FIG. 3E, measurements of respective temperatures T2_*n* of each of the plurality of n regions 50_*n* are taken using the thermal sensor 72 and form the second set S2 of temperatures.

The thermal sensor 72 may be a thermal camera with a high-resolution pixel array configured to monitor the build bed surface 12. A plurality of pixels may be arranged such that each of the plurality of pixels measures a temperature for a corresponding one of a plurality of locations defining the plurality of regions 50_*n*. The steps of measuring the temperatures T1, T2 may comprise measuring with each of the plurality of pixels a respective first and second temperature T1, T2 of a region 50_1. It is not essential that the first and second temperature T1, T2 are measured over the entirety of each region as defined by absorption modifier. The measurements at block 106 and 112 may be carried out over respective sub-regions defined within each region 50_*n*. The measured temperatures T1, T2 may further be an average of the temperature measured by more than one pixel of each region 50_*n*.

As FIGS. 3B to 3E illustrate, by way of a preferred example of the layer cycle, the first and second heat sources L1, L2 may be operated at their respective input power profiles P1, P2 for the entire duration of their traverse of the build bed surface 12: in other words, the first and second input power profiles extend along the first direction and along the entire build bed surface 12. Where the first and second heat sources L1, L2 further extend along the width of the build bed surface 12, the entire build bed surface may be heated in a single traverse of a respective one of the first and second heat sources L1, L2.

To determine the first set S1 of temperatures, the thermal sensor may be used to capture the temperature of each region 50_*n* at block 106 after a first time delay following the initiation of the step at block 104 of heating with the first heat source L1. Furthermore, the thermal sensor may be used to capture the temperature of each region 50_*n* at block 112 after a second time delay following the initiation of the step at block 110 of heating each of the plurality of regions with the second heat source L2. Preferably, the respective first and second time delays are the same for each layer. In addition, the respective first and second time delays may be equal to one another.

At block 120, the layer cycle is repeated for a further m−1 layers to achieve a total of m calibration layers, achieving m sets of first and second temperature sets S1, S2. The number of layers m required to determine adjusted input power profiles may depend on whether one or both of the heat sources are to apply constant adjusted input power profiles or variable adjusted input power profiles, and/or whether more than two heat sources are to be calibrated. In any variant of the calibration method that takes account of further heat sources or varying input power profiles, each layer cycle comprises sets of input power profiles applied to all of the heat sources used, each set being different to all other sets of input power profiles by at least one of the input power profiles. A varying input power profile may be defined by a starting value and an end value and varied linearly along the first direction.

Once all m layers are complete, the method proceeds to determination steps 200. This comprises at block 202, receiving the first target temperature T1(target) and the second target temperature value T2(target). At block 210, these first and second temperature target temperatures are used to determine, from the measured first sets S1_1, S2_1 . . . . S1_*m* of temperatures and the measured second sets S2_1, S2_2 . . . , S2_*m* of temperatures, for each of the total number m pairs of input powers, an adjusted first and/or second input power profile P1′, P2′ for the first and/or second heat source L1, L2. The target temperatures may be chosen such that T1(target) is below the melting point but above a solidification temperature of the particulate material, and the second target temperature is chosen to be or exceed the melting temperature of the particulate material. This provides for appropriate calibration of the input power profiles for a subsequent build cycle, during which a step of heating following distribution of a fresh layer preheats the layer to avoid warping due to temperature differentials within and between the layers; and during which a step of heating is to fuse the particulate material of a region over which absorption modifier (usually in the form of radiation absorber) has been deposited to form a cross section of an object.

The adjusted first and/or second input power profiles P1′ and P2′ are such that, when they are applied to the respective first or second heat source L1, L2 during a subsequent layer cycle, the measured adjusted first set S1′ of temperatures falls within an adjusted first range R1 of the first target temperature T1(target), and the measured adjusted second set S2′ of temperatures falls within a second range R2 of the second target temperature T2(target), such that the first and second ranges R1, R2 are reduced over the corresponding ranges of sets S1_*m*, S2_*m* of measured first and second temperatures for each of the calibration layers. A number of approaches for determining the adjusted first and/or second input power profiles may be suitable, for example an optimisation technique. It will be understood that a subsequent layer cycle such as that of a build process may have substantially the same layer cycle as that of the calibration process, while keeping the adjusted pairs of input powers substantially the same for each layer and not requiring the step of measuring and analysis for the sake of calibration. The subsequent layer cycle preferably applies the same components, directionality and speeds of applying thermal energy to each layer as for the calibration process.

Consistent Thermal Cycle

The thermal stability of the layer cycle may further be improved when the calibration method applies any one, or any combination of, and preferably all of the following, to the layer cycle disclosed herein, and which may further preferably also apply to the layer cycle of a subsequent build process:

heating each layer at block 104 by passing the first heat source L1 in the first direction over the layer at a first speed profile while operating the first heat source L1 at the first input power profile P1. For example, the first heat source L1 may be mounted to the first carriage 30_1 in FIGS. 1A and 1s operated while the first carriage 30_1 traverses the build bed surface 12.

heating each layer at block 110 by passing the second heat source L2 (or the first heat source L1 again) in the first direction over the layer at a second speed profile while operating the second heat source at the second input power profile P2. For example, the second heat source L2 may be mounted to the second carriage 30_2 in FIGS. 1A and 1s operated while the second carriage 30_2 traverses the build bed surface 12.

the first speed profile of the first heat source L1 is the same as the second speed profile of the second heat source L2.

the first speed profile and the second speed profile are substantially constant speed profiles.

the step of depositing radiation absorber at block 108 is carried out by passing the deposition module 38 in the first direction.

In preferred variants of the method, respective time periods between the initiation of two adjacent steps, and preferably between each step and the previous step, in each layer cycle remains the same for each corresponding step in each successive layer cycle. For example, a preferred variant may further comprise initiating the step at block 102 of distributing each further layer after a first time interval following initiating the step at block 110 of heating the layer (the build bed surface 12) of the previous layer cycle with the second heat source; and initiating the step at block 110 of heating each of the plurality of regions (or the build bed surface 12) with the second heat source L2, after a second time interval after the step at block 102 of distributing the previous layer; and wherein the respective first and the second time interval are the same for each layer. Furthermore, for each layer, the layer cycle may comprise initiating the step at block 110 of heating each layer with the second heat source L2 after a third time interval following initiating the step at block 104 of heating the build bed surface with the first heat source L1; and/or the layer cycle may comprise initiating the step at block 104 of heating each layer with the first heat source L1 after a further time interval following initiating the step at block 102 of distributing each layer. Optionally, the step of depositing absorption modifier over the plurality of regions 50_n for each layer at block 108 may be initiated after a fourth time interval following initiating the step of heating the build bed surface 12 with the first heat source at block 104, wherein the fourth time interval is the same for each layer. However, this step may be considered, in most processes, a less significant thermal event of the layer cycle.

Figure 6:
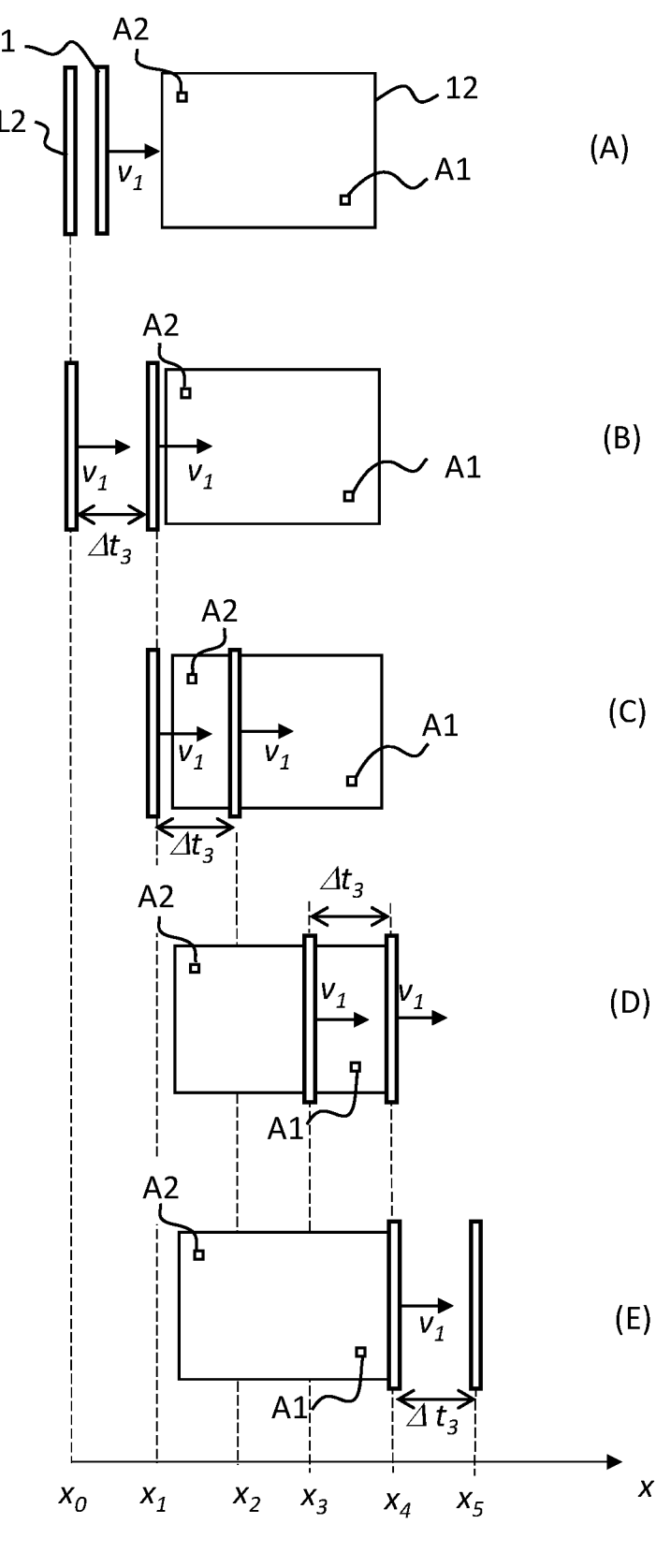
FIG. 6 is a schematic illustration of a layer cycle 100 of a preferred variant.

A preferred layer cycle according to the above is further illustrated in FIG. 6, which is a simplified schematic illustration of two main thermal events along the process direction that may be applied using the two-carriage layout of FIG. 1A and FIG. 3. For simplicity, only the first heat source L1 and second heat source L2 are shown, representing two significant thermal events of heating separated by a time interval, which represents the above-described third time interval $\Delta t_3$. The direction of traverse of the heat sources L1, L2 is along the first direction, indicated along x. Two locations A1 and A2 are indicated on the build bed surface 12, A2 towards the near end of the build bed surface 12 with respect to the left of the build bed surface 12, and A1 to the far end of the build bed surface 12 with respect to the near end.

In FIG. 6A, the first and second heat sources L1, L2 are shown in a starting position ready to start the layer cycle.

The first heat source L1 (in analogy to FIG. 1A, the first carriage 30_1) starts to traverse the build bed surface 12 at a constant speed v1=const to carry out the step of heating at block 104 of FIG. 2. Ahead of the first heat source L1, in analogy to FIG. 1A, the distribution module 32 moves at the same speed v1 to distribute the layer, the layer forming the build bed surface 12, so as to be heated by the first heat source L1 after the further time interval indicated above (not shown in FIG. 6). The further time interval is determined by the speed v1 and the distance between the distribution module 32 and the first heat source L1 on the first carriage 30_1.

In FIG. 6B, after the third time interval $\Delta t_3$, which may be relatively longer than the further time interval, the second heat source L2, from its position x0, starts to follow the first heat source L1 along the first direction at the constant speed v1 (and in analogy to FIG. 1, the second carriage 30_2 starts to follow the first carriage 30_1) to start the heating step of block 110 of FIG. 2. In analogy to FIG. 1A, ahead of the second heat source L2, the deposition module 38 moves at the same speed v1 to deposit radiation absorber over the regions 50_n after the fourth time interval (not shown in FIG. 6) following heating the build bed surface 12 with the first heat source L1. The fourth time interval according to the carriage arrangement of FIG. 1A depends on the third time interval $\Delta t_3$, the speed v1 and the distance between the deposition module 38 and the second heat source L2 on the second carriage 30_2.

In FIGS. 6C and 6D, the first heat source L1 and the second heat source L2 are illustrated in different positions during their traverse of the build bed surface 12. In FIG. 6C, the first heat source L1 is in position x2 and has passed location A2, and the second heat source L2 at position x1 is just reaching the near edge of the build bed surface 12. The distance between the two heat sources remains the same since both move at the same speed v1, and thus the third time interval $\Delta t_3$ remains constant as the two heat source traverse the build bed surface 12 separated by a fixed distance.

In FIG. 6D, the first heat source L1 is at position x4 and has now also passed location A1, and the second heat source L2, at position x3, has passed location A2.

In FIG. 6E, the first heat source L1 has reached position x5 at the end of its traverse and stops. It may be turned off once it passes the far end of the build bed surface 12. At this time in the layer cycle, the second heat source L2 has reached position x4 at the far end of the build bed surface 12 and may be turned off. Both heat sources L1, L2 next return to the starting position at a return speed that may be faster than v1. The return speed, or speeds, and the distance of traverse of the first and second carriage 30_1, 30_2 to the starting position determine the length of the first time interval between the steps of heating with the second heat source L2 at block 110 and distributing a fresh layer at block 104. The second time interval is defined by the distance between the distribution module and the second heat source L2. In this example, the first time interval may be shorter than the second time interval where the return speed is much faster than v1. Preferably, the first time interval is also a fixed time interval applied in the same way for each layer cycle.

From these illustrations it can be seen that location A2 experiences the event of heating with the second heat source L2 after a fixed third time interval $\Delta t_3$ of heating with the first heat source L1. Location A1 near the far end of the build bed surface 12 also experiences the event of heating with the second heat source L2 after a fixed third time interval $\Delta t_3$ of heating with the first heat source L1. The second time interval and the fourth time interval are fixed as long as the speed v1 is constant, since these time intervals are determined by the respective distance between the distribution module and the first heat source L1, or between the deposition module and the second heat source, and speed v1.

In this way, the duration of time of the layer cycle may be substantially the same for each layer. It has been found that this provides for an improved stable thermal cycle and for a more reliable build process when these layer cycle conditions are equally applied to the calibration process. In this way, each location on the build bed surface 12 experiences the same layer cycle steps after the same respective time intervals and for the same respective durations, providing a stable and consistent layer cycle. The same considerations apply for each of the plurality of regions 50_n or for any location of an object cross section during a subsequent build process.

Third Heat Source Considerations

The apparatus 1 may comprise a third heat source 20 arranged stationary above the build bed surface 12, such as the overhead heater 20 in FIG. 1A (also referred to herein as "stationary heat source" 20, or overhead heater). During the layer cycle of the calibration method disclosed, one or more further temperature measurements may be made by the thermal sensor 72 of the temperature of or within the build bed surface 12. In response to the one or more further measurements, the stationary heat source 20 may be operated so as to maintain the temperature of some or preferably at least a majority of the build bed surface 12 at or near a target layer temperature T4(target). The target layer temperature T4(target) may for example be 10-20° C. below the melting point of the particulate material so as to keep temperature differentials between fused and unfused areas low. The stationary heat source 20 may comprise an array of individually addressable heater elements configured to provide individual, or zonal, thermal compensation over corresponding regions on the build bed surface 12. In variants, and depending on the type of heat source and mode of operation, it may be preferable to operate the stationary heat source 20 continuously throughout the duration of time of the layer cycle. This may mean that the stationary heat source 20 is operated throughout each step of the layer cycle, and for the duration of the calibration process. Continuous operation may comprise operating each heating element of the stationary heat source 20 at respective constant or variable duty cycles.

Figure 7:
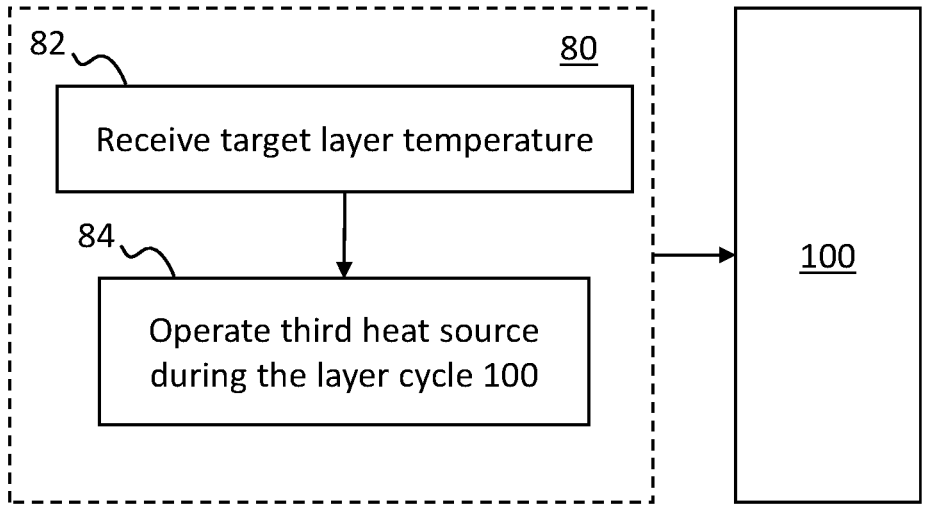
FIG. 7 illustrates further detail of the flow chart of FIG. 2.

FIG. 7 illustrates a variant of the layer cycle 100 further comprising heating 80 by the stationary heat source 20 (e.g. overhead heater 20) throughout the layer cycle 100. Heating by the third heat source may be intermittent or continuous throughout the layer cycle. Based on a target layer temperature received at block 82, the stationary heat source 20 is operated at block 84 so as to achieve and/or maintain the build bed surface 12 at or close to, within a predefined range, the target layer temperature T4(target). During a build process, the stationary heat source 20 may be operated in the same manner, and during which the first heat source L1 may preheat the build bed surface 12, or at least a majority of the build bed surface 12, to a temperature close to but below, or to a temperature of, the target layer temperature T4(target), and wherein the stationary heat source 20 is operated to achieve the target temperature T4(target), or to maintain the target layer temperature T4(target), within the predefined range.

The stationary heat source 20 is preferably feedback controlled, and operated based on one or more of the further one or more temperature measurements measured over or within the build bed surface 12 during the layer cycle using the thermal sensor 72. These measurements may be made to capture the temperature of the build bed surface 12 following a specific step of the layer cycle. In combination with a thermal sensor 72 having an array of sensor pixels for example, measuring the temperature of the build bed surface 12 after any of the steps of the layer cycle may comprise determining a zonal temperature for each of a plurality of zones of the build bed surface 12 as measured by a subset of the sensor pixels. From this, a zonal temperature difference may be determined between each zonal temperature and the target layer temperature T4(target); and the step of heating each layer by the stationary heat source 20 may comprise heating each zone by operating one or more corresponding heater elements of the array of individually operable heating elements in response to the determined zonal temperature difference.

Single Versus Multiple Heat Sources

In some apparatus, the first and second heat sources L1, L2 may be a single heat source operated in two different "modes", i.e. a preheat mode and a fuse mode. This might require that the same heat source is calibrated against the thermal sensor for two different modes of operation, represented by very different power inputs, for example, following the procedure as described. For example, the apparatus in FIG. 1A may only comprise the first heat source L1 used to carry out both heating steps, and thus requiring the first carriage 30_1 to be returned to the left hand side of the build bed surface 12 after the first heating step and before the second heating step.

For other variants of the apparatus, further moveable heat sources, such as a further second heat source L2_2 following the second heat source L2, the two heat sources may be treated as a single heat source operated at additional pairs of power inputs, such that for each layer the heat sources are operated at respective set of three input power profiles (P1, P2, P3) per layer: the first heat source L1, during the step of heating the plurality of regions 50_n at block 104, is operated at input power profile P1 as before, and the first and second heat sources L2, L2_2 are operated at respective input power profiles P2, P3 at block 110. Similarly, where the further heat source is a further first heat source L1_2, for each layer the heat sources are operated at a respective set of three input power profiles (P1, P2, P3) such that the first heat source L1 and further first heat source L1_2 are operated at input power profiles P1 and P3 during the step of heating at block 104, and the second heat source L2 is operated at input power profile P2 during the step of heating at block 110. In each case, the steps of measuring the first second and third temperature remain the same. The first and second temperatures measured according to the method disclosed herein thus allow the determination of an adjustment for the input power to one or both (or any further) of the heat sources that takes into account the heating effect of both first and second (and optionally further) heat sources within the same layer.

Distribution of Regions 50_n

The plurality of regions 50_n may be located over any location over the build bed surface 12. In order to provide for flattened temperature profiles following heating with the first and second heat source, the regions 50_*n* may preferably be distributed over the entire build bed surface 12, as illustrated schematically in FIG. 4 in a plan view of the build bed surface 12 by the location of regions 50_1 to 50_*n*. It is not essential that the location of each region 50_*n* coincides with that of the next layer, or any of the other layers, of the number of layers. Different first sets of temperatures may originate from different pluralities of regions located in different locations compared to one another. After the completion of the calibration method, i.e. after the total number m of layer cycles, the processed first and second regions form one or more test objects that may be removed and discarded from the completed build after depowdering.

It should be noted that it is not necessary to immediately proceed from one layer of the layer cycle described herein to the next layer of the calibration method. Instead, between adjacent layer cycles of the number m of layer cycles, a different layer cycle to the number of layer cycles may be carried out. For example, a number of unprocessed, blank layers may be distributed without the steps of, for example, depositing absorption modifier and heating with the second heat source L2, such that one or more intermediate layer cycles are applied that are different to the layer cycle of the disclosed calibration method.

In order for the thermal sensor 72 to be able to measure the temperature of the first region 50_1 following heating by the first heat source L1, and to measure the temperature of the first region 50_1 and the second region 50_2 following heating with the second heat source L2, the regions must necessarily be within the field of view of the thermal sensor 72 at the required timing during the layer cycle. From FIG. 1A and FIG. 3 it can be seen that the first heat source may be arranged at a trailing edge of the first carriage 30_1 with respect to the process direction along x, and the second heat source L2 may be arranged at a trailing edge of the second carriage 30_2 with respect to process direction. The thermal sensor 72 is thus capable of imaging the first region 50_1 after the first heat source L1 has passed and the first and second regions 50_1, 50_2 after the second heat source L2 has passed without obstruction. Furthermore, the thermal sensor 72 may image the first region 50_1 after a fixed time delay following heating with the first heat source L1. For example, with reference to FIG. 2 and FIG. 3, the step of measuring the first temperature T1 at block 106 and the step of measuring the second temperature T2 and the third temperature T3 at block 112 may be carried out after a predetermined fixed time delay following the respective steps of heating with the first heat source L1 at block 104 and heating with the second heat source L2 at block 110. Preferably, the predetermined fixed time delay is the same following the respective steps of heating with the first heat source L1 at block 104 and heating with the second heat source L2 at block 110; however, in variants they may be different.

When the first heat source L1 and the second heat source L2 are arranged on a single carriage, for example by joining carriage 30_1 to carriage 30_2, a gap, or viewing window, between the first heat source L1 and the deposition module 38 may be provided such that the first region 50_1 may be viewed by the thermal sensor 72 over a certain period of time following the step of heating with the first heat source L1, and before the droplet deposition module obscures the first region 50_1 as the carriage passes. Similar considerations apply when the order of the carriages is reversed.

The method and its variants as described may be carried out in part or fully by a controller 70 of the apparatus 1. The controller 70 may, for example, be configured to control the power inputs P1, P2 to the first and second heat sources L1, L2 and to the third heat source 20, for example, based on the target layer temperature T4(target) and/or based on measurements of the build bed surface 12 by the thermal sensor 72, with reference to the variant of FIG. 7. The controller 70 may further control the movement of the carriages 30_1, 30_2 and the various time intervals between the initiation of the layer cycle steps. The controller 70 may carry out determination steps 200, as shown in FIG. 2, and apply the determined adjustments to the input power of the first and/or second heat source L1, L2 during a subsequent process, such as a calibration process for the thermal sensor 72 and/or a build process for a 3D object. A possible sequence of processes is illustrated in the flow chart of FIG. 5. For example, the calibration method 400 of the first and second heat source, comprising the layer cycle 100 and determination steps 200 of FIG. 2, may be carried out after a calibration process 300 for the thermal sensor. Based on temperature measurements of a test region using the thermal sensor 72, wherein the test region is progressively heated over successive layer cycles, a set point for the temperature scale of the thermal sensor 72 may be determined with respect to a characteristic in the measured temperature evolution related to the melting temperature of the particulate material. In the subsequent calibration routine 400 according to the method described herein, the adjusted input power of the first and/or second heat source determined in the determination steps 200 in FIG. 2 are determined based on calibrated measurements using the calibrated thermal sensor 72. Following the calibration routine 400 for the first and second heat sources L1, L2, the adjusted input power of the first and/or second heat source L1, L2 may be applied to a subsequent build process 500, and in which the overhead heater 20 is operated based on measurements by the calibrated thermal sensor 72 to achieve the target layer temperature. The controller 70 may control all or any one of the calibration routines at blocks 300 and 400 and the build process at block 500.

The invention claimed is:

1. A method for increasing thermal stability of a build bed surface in an apparatus for layer-by-layer manufacture of a 3D object from particulate material; the apparatus comprising a controller, at least one heat source and a thermal sensor; the method comprising:

performing a calibration layer cycle in which a single layer of the particulate material is provided as a calibration layer, the calibration layer cycle sequentially including the steps of:

(a) distributing the calibration layer of the particulate material over a build bed along a first direction, the calibration layer providing a build bed surface of the build bed;

(b) after initiating step (a), operating a first heat source along the first direction at a first input power profile to heat the calibration layer;

(c) after step (b), measuring a first set of temperatures using the thermal sensor, the first set of temperatures comprising respective first temperature measurements of each of a plurality of regions within the build bed surface;

(d) after step (c), depositing a radiation absorber over each region of the plurality of regions; and/or depositing an absorption inhibitor over a surrounding area surrounding the plurality of regions;

(e) after initiating step (d), operating a second heat source along the first direction at a second input power profile to heat each region; and (f) after step (e), measuring a second set of temperatures using the thermal sensor, the second set of temperatures comprising respective second temperature measurements of each region of the plurality of regions;

repeating the calibration layer cycle of steps (a) through (f) for a number of calibration layers, each subsequent calibration layer cycle using a respective pair of first and second input power profiles, wherein each of the respective pair of first and second input power profiles is different to a preceding pair or pairs of first and second input power profiles; and after repeating the calibration layer cycle of steps (a) through (f) for the number of calibration layers, the controller comparing each of the measured first sets of temperatures to a first target temperature and determining a first range in which each of the measured first sets of temperatures falls, and the controller comparing each of the measured second sets of temperatures to a second target temperature and determining a second range in which each of the measured second sets of temperatures falls; and the controller comparing the determined first range and second range of previous pairs of input power profiles and determining therefrom an adjusted first input power profile and/or an adjusted second input power profile, performing a further layer cycle including at least the steps of (a), (b), (d) and (e) using the adjusted first and/or second input power profiles in the heating steps (b) and (e) thereby increasing the thermal stability of the build bed surface such that each of a further measured first set of temperatures are within a reduced first range of the first target temperature and each of a further measured second set of temperatures are within a reduced second range of the second target temperature, the reduced first and second ranges of subsequent layers being reduced relative to the first and second ranges of previous calibration layers.

2. The method of claim 1, further comprising the heating the calibration layer in step (b) by passing the first heat source in the first direction over the calibration layer at a first speed profile while operating the first heat source at the first input power profile.

3. The method of claim 1, further comprising the heating the calibration layer in step (b) by passing the first heat source in the first direction over the calibration layer at a first speed profile while operating the first heat source at the first input power profile; and the heating the calibration layer in step (e) by passing the second heat source in the first direction over the calibration layer at a second speed profile while operating the second heat source at the second input power profile.

4. The method of claim 3, wherein one or both of:
the first speed profile is the same as the second speed profile;
the first speed profile and the second speed profile are substantially constant speed profiles.

5. The method of claim 1, comprising one or both of:
at least one of the first and second input power profiles of at least one of the pairs of input power profiles is a constant power input; and
at least one of the first and second input power profiles of at least one of the pairs of input power profiles varies along the first direction.

6. The method of claim 1, wherein at least one pair of input powers comprises equal first and second input power profiles.

7. The method of claim 1, wherein the step (c) of the measuring the first set of temperatures is initiated after a first time delay after the step (b) of the heating with the first heat source; and the step (f) of the measuring the second set of temperatures is initiated after a second time delay after the step (e) of the heating each of the plurality of regions, and wherein the respective first and second time delays are the same for each of the number of calibration layers.

8. The method of claim 1, wherein respective time periods between initiation of each step and initiation of a previous step in each calibration layer cycle are constant for each corresponding step in each successive calibration layer cycle.

9. The method of claim 1, wherein for each calibration layer, the calibration layer cycle further comprises:
initiating the step (a) of the distributing each further calibration layer a first time interval after initiating the step (e) of the heating a previous layer;
initiating the step (e) of the heating each of the plurality of regions after a second time interval after the step (a) of the distributing the previous layer;
wherein the respective first and the second time interval are the same for each calibration layer.

10. The method of claim 1, wherein for each calibration layer, the calibration layer cycle further comprises initiating the step (b) of the heating each calibration layer with the first heat source a first time interval after initiating the step (a) of distributing the calibration layer, wherein the first time interval is the same for each calibration layer.

11. The method of claim 1, wherein in the step (c) the radiation absorber is applied.

12. The method of claim 1, further comprising, over a duration of time of the calibration layer cycle, operating a stationary heat source arranged above the build bed surface so as to maintain the temperature of at least a majority of the build bed surface at or near a target layer temperature, wherein the target layer temperature is lower than a melting temperature of the particulate material and higher than a solidification temperature of the particulate material.

13. The method of claim 12, wherein the stationary heat source is operated continuously for the duration of the calibration layer cycle.

14. The method of claim 12, wherein the stationary heat source is operated based on one or more further temperature measurements of the measured within the build bed surface after any one of the steps (a) of the distributing, (b) of the heating, (d) of the depositing and (e) of the heating, using the thermal sensor, during the calibration layer cycle.

15. The method of claim 1, wherein each calibration layer comprises a plurality of sublayers, wherein each sublayer is processed according to the same calibration layer cycle steps as for that calibration layer; and wherein from one or more of the plurality of sublayers, a respective average first and second temperature is determined for the measured first and second sets of temperatures for each region.

16. The method of claim 1, wherein the adjusted first input power profile is decreasing along the first direction; further wherein, during the subsequent calibration layer cycle, the first heat source is operated at the adjusted first input power profile at step (b) to preheat a freshly distributed subsequent calibration layer to a temperature between a solidification temperature and a melting temperature of the particulate material; wherein at step (c) a subsequent region is defined by depositing radiation absorber over the subsequent region;

and/or by depositing absorption inhibitor over a surrounding area surrounding the subsequent region; and wherein at step (e) the second heat source is operated at the adjusted second input power profile to melt the particulate material of the subsequent region.

17. The method of claim 1, further comprising, between adjacent calibration layer cycles of a number of calibration layer cycles, a different calibration layer cycle to the number of calibration layer cycles.

18. The method of claim 1, wherein the first target temperature is between a solidification temperature and a melting temperature of the particulate material, and wherein the second target temperature is equal to or higher than the melting temperature of the particulate material.

19. The method of claim 18, wherein, during a subsequent calibration layer cycle, the first heat source is operated at the adjusted first input power profile at step (b) to preheat a freshly distributed subsequent layer to a temperature between the solidification temperature and the melting temperature of the particulate material; wherein a subsequent region is defined by depositing radiation absorber over the subsequent region; and wherein step (e) is carried out by operating the second heat source at the adjusted second input power profile to melt the particulate material of the subsequent region.

* * * * *